United States Patent
Chan

(10) Patent No.: US 10,946,334 B2
(45) Date of Patent: Mar. 16, 2021

(54) DEVICE AND SYSTEM FOR DECOMPOSING AND OXIDIZING GASEOUS POLLUTANT

(71) Applicant: SIW Engineering PTE. LTD., Kallang (SG)

(72) Inventor: Chee-Wei Chan, Kallang (SG)

(73) Assignee: SIW ENGINEERING PTE. LTD., Singapore (SG)

( * ) Notice: Subject to any disclaimer, the term of this patent is extended or adjusted under 35 U.S.C. 154(b) by 0 days.

(21) Appl. No.: 16/736,669

(22) Filed: Jan. 7, 2020

(65) Prior Publication Data

US 2020/0164309 A1 May 28, 2020

Related U.S. Application Data

(63) Continuation of application No. PCT/SG2018/050332, filed on Jul. 5, 2018.

(60) Provisional application No. 62/529,795, filed on Jul. 7, 2017.

(51) Int. Cl.
| | |
|---|---|
| *B01D 53/76* | (2006.01) |
| *B01D 53/38* | (2006.01) |
| *B01D 53/34* | (2006.01) |
| *B01D 21/26* | (2006.01) |
| *B01D 47/14* | (2006.01) |
| *F23G 7/06* | (2006.01) |

(52) U.S. Cl.
CPC ......... *B01D 53/346* (2013.01); *B01D 21/267* (2013.01); *B01D 47/14* (2013.01); *B01D 53/38* (2013.01); *B01D 53/76* (2013.01); *F23G 7/065* (2013.01); *B01D 2258/0216* (2013.01)

(58) Field of Classification Search
None
See application file for complete search history.

(56) References Cited

U.S. PATENT DOCUMENTS

| | | | | |
|---|---|---|---|---|
| 5,123,836 | A | * 6/1992 | Yoneda | F23G 5/50 110/215 |
| 6,494,711 | B1 | * 12/2002 | Takemura | F23D 14/20 431/353 |
| 6,969,250 | B1 | * 11/2005 | Kawamura | B01D 53/70 431/185 |
| 7,985,379 | B2 | 7/2011 | Chiu et al. | |
| 10,215,407 | B2 | * 2/2019 | Miyazaki | F23L 1/00 |
| 2005/0135984 | A1 | 6/2005 | Ferron et al. | |
| 2007/0053803 | A1 | 3/2007 | Lee et al. | |
| 2008/0131334 | A1 | * 6/2008 | Kawamura | F23G 5/24 422/169 |

(Continued)

FOREIGN PATENT DOCUMENTS

| | | | |
|---|---|---|---|
| CN | 1580636 A | 2/2005 | |
| KR | 10-2011-0124630 A | 11/2011 | |
| WO | WO-2016143193 A1 * | 9/2016 | ............... F23M 5/08 |

*Primary Examiner* — Jelitza M Perez
(74) *Attorney, Agent, or Firm* — Muncy, Geissler, Olds & Lowe, P.C.

(57) ABSTRACT

The invention provides a device and system for decomposing and oxidizing of gaseous pollutants. A novel reaction portion reduces particle formation in fluids during treatment, thereby improving the defect of particle accumulation in a reaction portion. Also, the system includes the device, wherein a modular design enables the system to have the advantage of easy repair and maintenance.

2 Claims, 17 Drawing Sheets

(56) References Cited

U.S. PATENT DOCUMENTS

2010/0064891 A1     3/2010   Johnsgard
2012/0128541 A1     5/2012   Kashiwagi et al.

\* cited by examiner

US 10,946,334 B2

DEVICE AND SYSTEM FOR DECOMPOSING AND OXIDIZING GASEOUS POLLUTANT

CROSS-REFERENCE TO RELATED APPLICATION

This application is a continuation of co-pending International Patent Application No. PCT/SG2018/050332, filed on Jul. 5, 2018, which is incorporated by reference herein in its entirety. The application claims priority to U.S. Provisional Application No. 62/529,795, filed on Jul. 7, 2017, the entire contents of which are incorporated herein by reference.

FIELD OF THE INVENTION

The present invention relates to a device for gaseous pollutants, and more particularly to a device for controlling the decomposition oxidation of a gaseous pollutant in semiconductor or other industrial manufacturing processes.

BACKGROUND OF THE INVENTION

Various chemicals used in the semiconductor manufacturing process, as well as toxic by-products that may be produced, will cause significant harm to human bodies and the environment. Examples of these chemicals include mixed gases containing antimony, arsenic, boron, germanium, nitrogen, phosphorus, silicon, selenium, halogen, halogen silane, or perfluoro compounds (PFCs), or by-products formed by the decomposition of the perfluoro compounds (PFCs).

In the conventional art, the harmful mixed gases or by-products are processed through a device for decomposing and oxidizing a gaseous pollutant, converted into products with lower environmental harm, and then discharged into the environment.

However, there are imperfections in the conventional device for decomposing and oxidizing of a gaseous pollutant. For example, in the currently used device, particles such as silicon oxide are easily formed and deposited on a wall of a combustion chamber of the device, resulting in blocking of the combustion chamber and problems such as incomplete combustion. In order to avoid the above problems and prolong the service life of the device, it is bound to clean the device more frequently and input more cost for maintaining the device. However, the maintenance procedure for the device is a disadvantage in labor resources and cost for manufacturers.

In order to improve the above disadvantage and other deficiencies, many research teams have made active development. For example, in U.S. Pat. No. 7,985,379B2 discloses a thermal reaction chamber designed with a structure of stacked mesh ceramic rings in order to reduce the accumulation of particles generated during the reaction When air passes through holes of the mesh ceramic rings, a boundary like structure is formed to prevented the particles from being deposited on an inner wall of the thermal reaction chamber. The patent also proposes other methods to avoid particle deposition. For example, an inner wall of a gas inlet passage is electrically polished to make the mechanical roughness (Ra) lower than 30, making it difficult for particles to adhere to a waste gas.

The above method can only reduce particle attachment as much as possible, but the effect is limited. From another perspective, how to reduce the generation of particles may also be a direction that can be focused on, and further research is urgently needed.

SUMMARY OF THE INVENTION

A main object of the invention is to solve the problem that in a conventional emission reduction system, a combustion chamber is prone to incomplete combustion due to blockage.

In order to achieve the above object, the invention provides a device for controlling the decomposition and oxidation of a gaseous pollutant. The device not only can reduce the problem of particle residue in the device, but also has the advantage of being easy to clean and maintain.

Specifically, an embodiment of the invention provides a device for decomposing and oxidizing a gaseous pollutant. The device includes a reaction portion, a washing portion, a hydraulic cyclone portion, and a water tank connected to the reaction portion, the washing portion and the hydraulic cyclone portion. The device is characterized in that the reaction portion includes a first cavity including a first inner wall which is annular and a first outer wall arranged concentrically with the first inner wall, the first inner wall defining a first chamber, the first outer wall provided with at least one waste gas inlet passage that penetrates the first outer wall and the first inner wall to communicate with the first chamber, the waste gas inlet passage including a first member, a second member and a connecting member, wherein both ends of the connecting member are connected to the first member and the second member respectively, the first member extends in a horizontal direction, one end not connected to the connecting member communicates with the first chamber, and the second member extends in a vertical direction; a first intermediate section, including a first inner ring wall, a first outer ring wall arranged concentrically with the first inner ring wall, at least one gas passage arranged between the first inner ring wall and the first outer ring wall and communicating with the first chamber to supply a fuel, and a pilot flame inlet provided in the first inner ring wall, the first inner ring wall defining a first internal space communicating with the first cavity; a second cavity, including a second inner wall which is annular and a second outer wall arranged concentrically with the second inner wall, the second inner wall defining a second chamber communicating with the first intermediate section, the second outer wall including at least one gas inlet passage for a gas to flow inward to the second chamber; a second intermediate section, including a second inner ring wall and a second outer ring wall arranged concentrically with the second inner ring wall, the second inner ring wall defining a second internal space communicating with the second cavity; and a third cavity including a second inner wall which is annular and a third outer wall arranged concentrically with the third inner wall, the third inner wall defining a third chamber communicating with the second intermediate section, at least one liquid passage arranged on the third outer wall and penetrating the third inner wall to introduce a liquid into the third chamber.

One embodiment of the invention provides a device for decomposing and oxidizing a gaseous pollutant. The device includes a reaction portion, a washing portion, a hydraulic cyclone portion, and a water tank connected to the reaction portion, the washing portion and the hydraulic cyclone portion. The device is characterized in that the reaction portion includes a first cavity including a first inner wall which is annular and a first outer wall arranged concentrically with the first inner wall, the first inner wall defining a first chamber, the first outer wall provided with at least one waste gas inlet passage that penetrates the first outer wall and the first inner wall to communicate with the first chamber; a first intermediate section, including a first inner ring wall, a first outer ring wall arranged concentrically with the first inner ring wall, at least one gas passage arranged between the first inner ring wall and the first outer ring wall and communicating with the first chamber to supply a fuel, and a pilot flame inlet provided in the first inner ring wall, wherein the first inner ring wall defines a first internal space communicating with the first cavity; a second cavity, including a second inner wall which is annular and a second outer wall arranged concentrically with the second inner wall, the second inner wall defining a second chamber communicating with the first intermediate section, a second intermediate section including a second inner ring wall and a second outer ring wall arranged concentrically with the second inner ring wall, the second inner ring wall defining a second internal space communicating with the second cavity; and a third cavity including a third inner wall which is annular and a third outer wall arranged concentrically with the third inner wall, the third inner wall defining a third chamber communicating with the second intermediate section, at least one liquid passage arranged on the third outer wall and penetrating the third inner wall to introduce a liquid into the third chamber.

The invention provides a system for decomposing and oxidizing a gaseous pollutant. The system includes an equipment portion and a control portion, and is characterized in that the equipment portion includes a reaction portion, a washing portion, a hydraulic cyclone portion, and a water tank. The reaction portion, the washing portion and the hydraulic cyclone portion communicate with the water tank via at least three communication ports of the water tank, respectively. The control portion extends vertically upward and is arranged adjacent to one side of the reaction portion, the washing portion or the hydraulic cyclone portion in parallel. The control portion includes a plurality of control switches that are electrically connected to the reaction portion, the washing portion, the hydraulic cyclone portion, and the water tank of the equipment portion.

The invention also provides a thermal reactor for removing a pollutant from a waste gas, which includes a thermal reaction unit including a chamber comprising a side wall, at least one waste gas inlet penetrating the side wall and communicating with the chamber to introduce a waste gas into the chamber in a non-longitudinal direction, a flame region formed in the chamber and below the waste gas inlet, the waste gas enters the flame region after being introduced into the chamber and moving downwardly by a vertical distance, and a chilling unit arranged below the thermal reaction unit, connected to the thermal reaction unit and configured to receive a gas stream from the thermal reaction unit, wherein the chilling unit includes a water curtain flowing through an inner wall of the chilling unit.

The invention also provides a thermal reactor for removing a pollutant from a waste gas, which includes a thermal reaction unit, including a chamber, at least one waste gas inlet communicating with the chamber to introduce a waste gas into the chamber, at least one fuel inlet communicating with the chamber to introduce a fuel which is used in a decomposition process of the waste gas in the chamber, and a pilot flame inlet communicating with the chamber to ignite the fuel, wherein the fuel inlet and the pilot flame inlet are provided below the waste gas inlet, and the waste gas inlet is spaced apart from the fuel inlet and the pilot flame inlet by a delayed combustion distance, and a chilling unit arranged below the thermal reaction unit, connected to the thermal reaction unit and configured to receive a gas stream from the thermal reaction unit, wherein the chilling unit includes a water curtain flowing through flowing through an inner wall of the chilling unit.

The invention also provides a thermal reactor for removing a pollutant from a waste gas, which includes a thermal reaction unit including a chamber and at least one waste gas inlet, the waste gas inlet communicating with the chamber to introduce a waste gas into the chamber, an ignition unit arranged below the thermal reaction unit and connected to the thermal reaction unit, the ignition unit including a flame chamber communicating with the chamber, the flame chamber including a fuel and a pilot flame for igniting the fuel, wherein the waste gas enters the chamber and moving downwardly along a vertical distance and then enters the flame chamber, and a chilling unit arranged below the thermal reaction unit, connected to the thermal reaction unit and configured to receive a gas stream from the thermal reaction unit, wherein the chilling unit includes a water curtain flowing through an inner wall of the chilling unit.

The invention provides a thermal reactor for removing a pollutant from a waste gas, which includes a thermal reaction unit including a chamber and at least one waste gas inlet, the waste gas inlet communicating with the chamber to introduce a waste gas into the chamber, an ignition unit connected to the thermal reaction unit, the ignition unit including a flame chamber communicating with the chamber, the flame chamber including a fuel and a pilot flame for igniting the fuel, wherein a gradually increasing temperature gradient is formed between the waste gas inlet and the pilot flame along a vertical axis, and a chilling unit arranged below the thermal reaction unit, connected to the thermal reaction unit and configured to receive a gas stream from the thermal reaction unit, wherein the chilling unit includes a water curtain flowing through an inner wall of the chilling unit.

The invention provides a thermal reactor for removing a pollutant from a waste gas, which includes a thermal reaction unit including a chamber and at least one waste gas inlet, the waste gas inlet communicating with h the chamber to introduce a waste gas into the chamber, an ignition unit arranged below the thermal reaction unit and connected to the thermal reaction unit, the ignition unit including an outer wall, an inner wall, a premixing chamber defined between the outer wall and the inner wall, and a flame chamber defined by the inner wall, and a chilling unit arranged below the thermal reaction unit, connected to the thermal reaction unit and configured to receive a gas stream from the thermal reaction unit, wherein the chilling unit includes a water curtain flowing through an inner wall of the chilling unit.

The invention provides a thermal reactor for removing a pollutant from a waste gas, which includes a first thermal reaction unit including a chamber and at least one waste gas inlet, the waste gas inlet communicating with the chamber to introduce a waste gas into the chamber, an ignition unit arranged below the first thermal reaction unit, the ignition unit including a flame chamber that communicates with the chamber, the flame chamber including a fuel and a pilot flame for igniting the fuel, a second thermal reaction unit arranged below the ignition unit, the second thermal reaction unit including an inclined inner wall, a conical chamber defined by the inclined inner wall, and at least one gas inlet passage that penetrates the inclined inner wall and provides a gas flow, wherein the gas flow is sprayed obliquely downward into the conical chamber to slow down the deposition of particles of the waste gas on the inclined inner wall, and a chilling unit arranged below the second thermal reaction unit, connected to the second thermal reaction unit and configured to receive a gas stream from the second thermal reaction unit, wherein the chilling unit includes a water curtain flowing through an inner wall of the chilling unit.

Therefore, the effects achieved by the invention compared with the conventional device are as follows:

(1) With a two-stage reaction portion of the invention, after the waste gas entering the reaction portion, the waste gas first moves by a distance and then be gradually heated. Compared with a conventional device, when the waste gas is immediately combusted after entering the device, the invention can effectively reduce the problem of incomplete combustion caused by particles in the waste gas blocking a combustion chamber.

(2) In the invention, a charge coupled device (CCD) sensor is provided to directly detect the temperature of the first chamber. Compared with the conventional device, the temperature of the first chamber can also be controlled directly and effectively.

The system for controlling the decomposition and oxidation of a gaseous pollutant of the invention comprises a plurality of openings on a housing, which are arranged correspondingly to the devices accommodated therein in a modular manner, so it has the advantage of easy maintenance.

DETAILED DESCRIPTION OF THE PREFERRED EMBODIMENTS

The detailed description and technical contents of the disclosure are explained below with reference to the drawings.

Figure 1A:
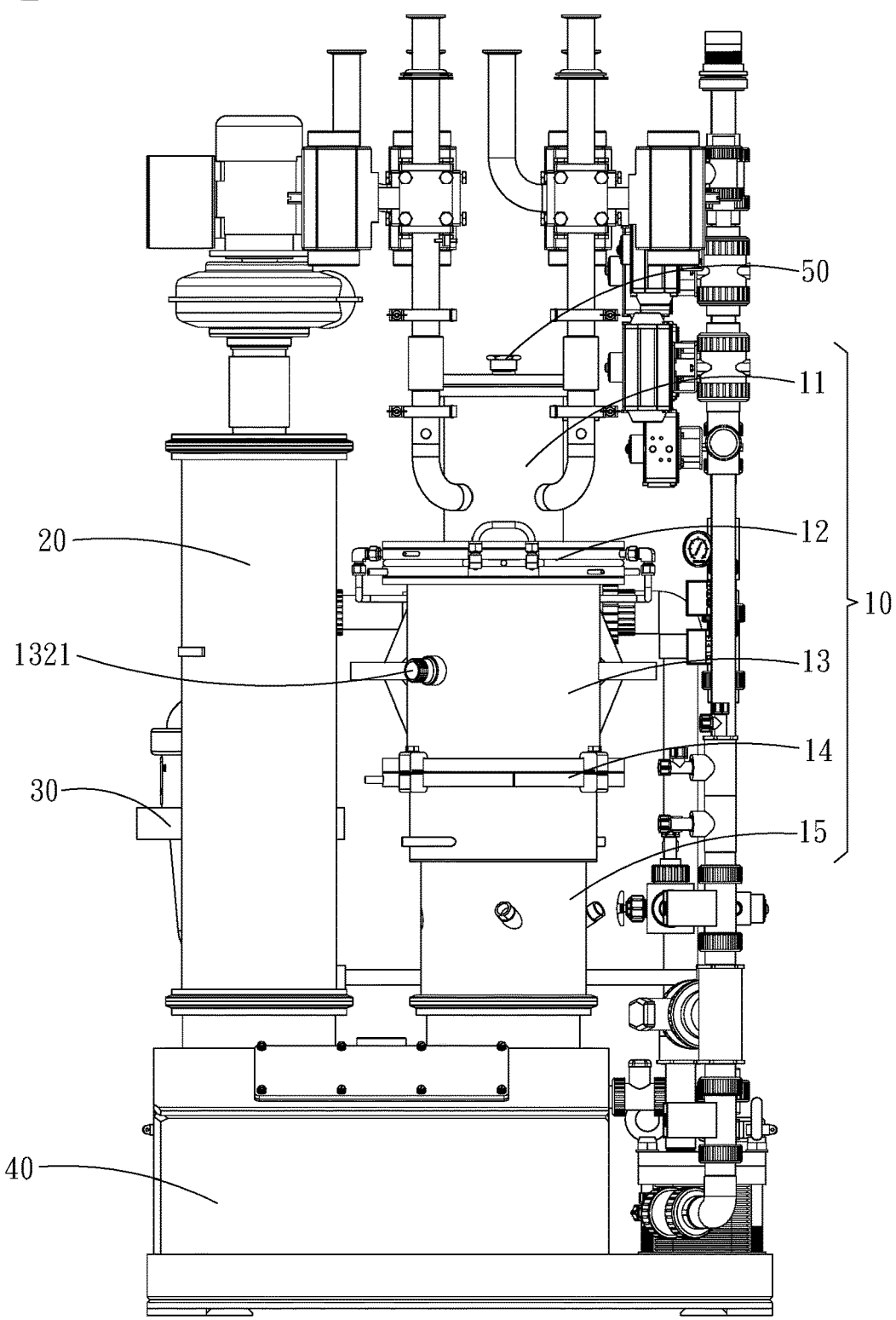
FIG. 1A is a front view of a device for decomposing and oxidizing of a gaseous pollutant according to an embodiment of the invention.
Figure 1B:
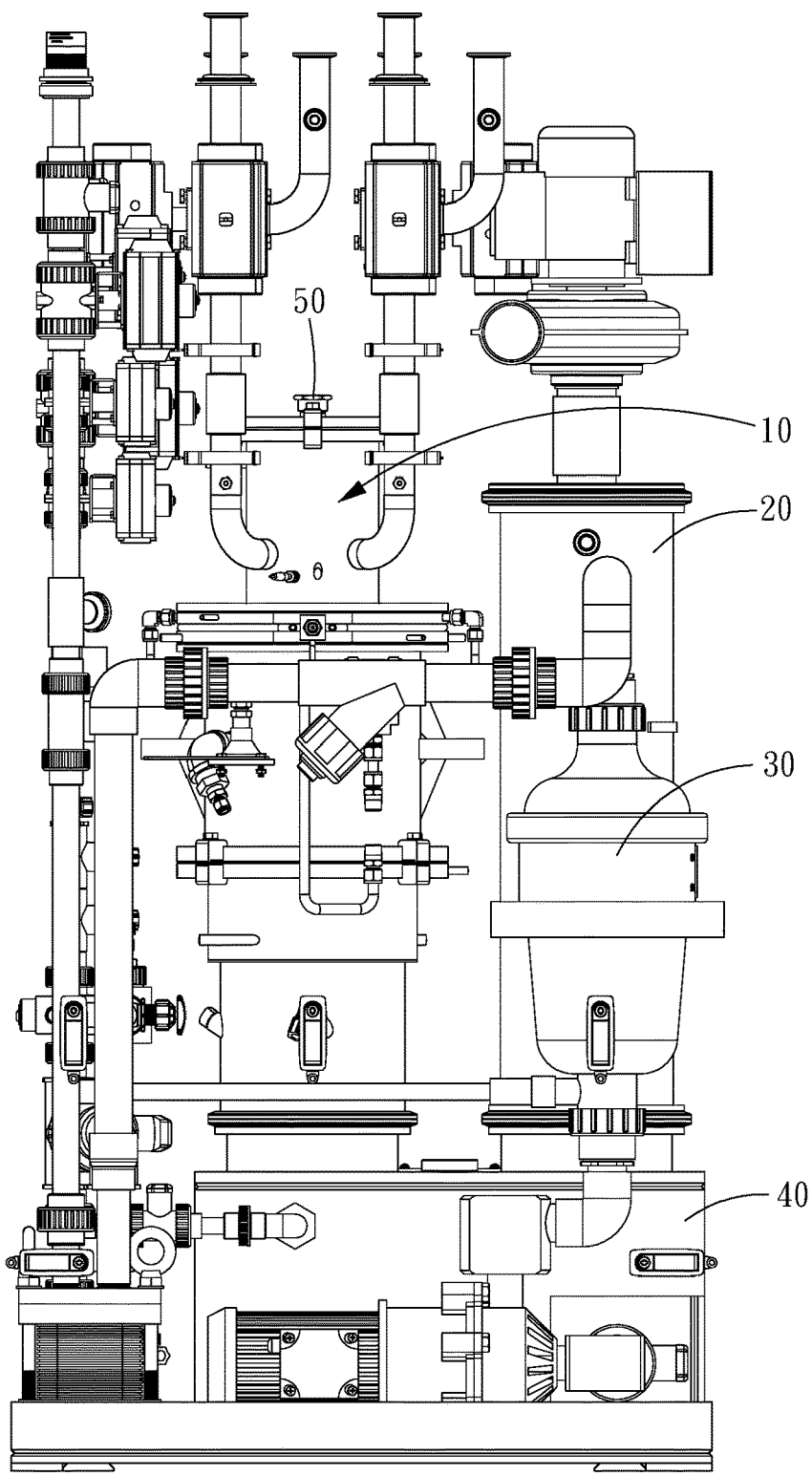
FIG. 1B is a rear view of a device for decomposing and oxidizing of a gaseous pollutant according to an embodiment of the invention.

FIG. 1A and FIG. 1B are a front view and a rear view of a device 1 for decomposing and oxidizing a gaseous pollutant according to an embodiment of the disclosure, respectively. The device 1 includes a reaction portion 10, a washing portion 20, a hydraulic cyclone portion 30, and a water tank 40 connected to the reaction portion 10, the washing portion 20 and the hydraulic cyclone portion 30, respectively.

The reaction portion 10 has a top and a bottom, and sequentially includes a first cavity 11, a first intermediate section 12, a second cavity 13, a second intermediate section 14, and a third cavity 15, from the top to the bottom.

Figure 2:
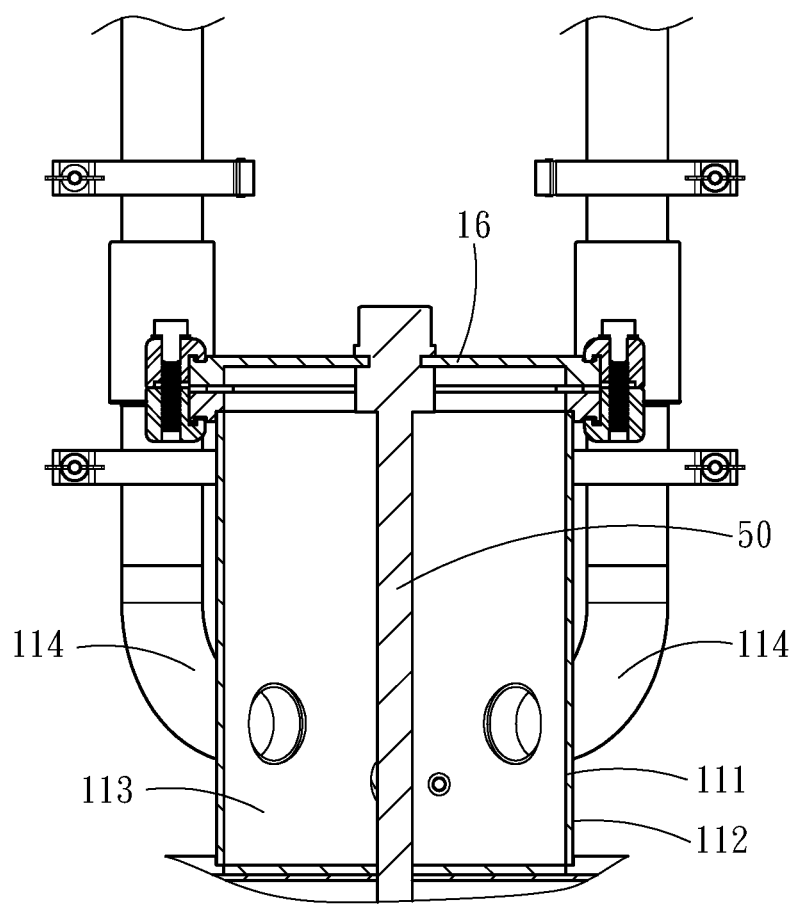
FIG. 2 is a cross-sectional schematic view of a first cavity according to an embodiment of the invention.

Refer to FIG. 2, the first cavity 11 includes a first inner wall 111 and a first outer wall 112. The first inner wall 111 is annular to define a first chamber 113. The first outer wall 112 surrounds the first inner wall 111 and is arranged concentrically with the first inner wall 111. At least one waste gas inlet passage 114 is provided on the first outer wall 112. The waste gas inlet passage 114 penetrates the first outer wall 112 and the first inner wall 111 and communicates with the first chamber 113 to let waste gas (or exhaust gas) enter the first chamber 113 via the waste gas inlet passage 114. In one embodiment, the waste gas is an effluent stream from one or more process chambers. Non-limiting examples of such process chambers include substrate processing systems used in, for example, semiconductor, flat panel, photovoltaic or other silicon and thin film processing applications.

Figure 3:
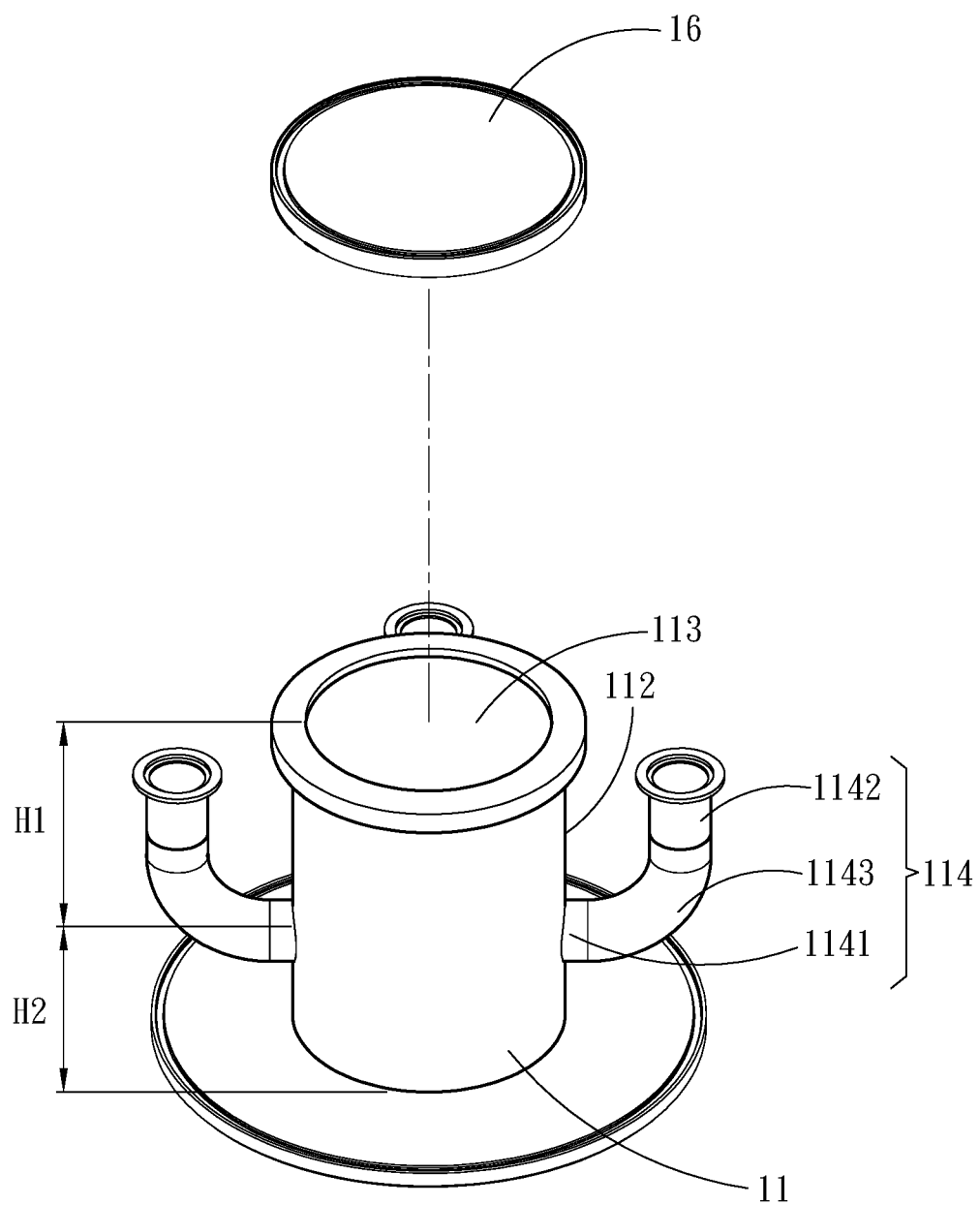
FIG. 3 is a schematic view of a first cavity according to an embodiment of the invention.

Refer to FIG. 2 and FIG. 3, in one embodiment, the waste gas inlet passage 114 includes a first member 1141, a second member 1142 and a connecting member 1143. Both ends of the connecting member 1143 are connected to the first member 1141 and the second member 1142, respectively. Taking a ground as a reference, the first member 1141 extends in a horizontal direction with the ground, and one end not connected to the connecting member 1143 connects with the first chamber 113. The second member 1142 extends in a perpendicular direction with the ground and the second member 1142 is parallel to the direction in which the first cavity 11 is arranged. An angle between the first member 1141 and the first outer wall 112 is between 75° and 135°. In a preferred embodiment, the angle is ranged from 75° to 90°, and more specifically in 90°. Therefore, compared with a conventional waste gas inlet passage that is only a long pipe vertically inserted into a chamber, the device 1 for decomposing and oxidizing a gaseous pollutant prolongs the moving time of waste gas in the device 1, thereby preventing the waste gas from entering the first chamber 113 too quickly to be combusted. In the present invention, the diameter of the waste gas inlet passage 114 is not particularly limited and could be changed as required.

Compared with the conventional device, the size of the reaction portion 10 and the waste gas inlet passage 114 in the invention is much smaller. In one embodiment, the height from a top of the first chamber 113 to a bottom of the water tank 40 is less than 160 cm, and preferably less than 150 cm. In the invention, it may be changed as required.

Refer to FIG. 3, H1 is defined as a distance between a position of the waste gas inlet passage 114 on the first outer wall 112 and the top of the first outer wall 112, and H2 is defined as a distance between the position of the waste gas inlet passage 114 on the first outer wall 112 and the bottom of the first outer wall 112. In one embodiment, H1 is greater than H2; and in another embodiments, H1 may be equal to or smaller than H2 as required. Accordingly, neither H1 nor H2 is 0, and specifically H2 is between 4 inches and 5 inches. Compared with a technology that waste gas is combusted as soon as it enters a chamber of a conventional device, waste gas of the invention needs to move a distance of H2 before be combusted in the first intermediate section 12 when waste gas is introduced into the first chamber 113. Therefore, waste gas would be heated beforehand, which effectively reduces the concentration phenomenon for generating particles caused by the excessive temperature difference of waste gas, thereby reducing the probability that particles are deposited or blocked in the first chamber 113.

In one embodiment, the reaction portion 10 further includes an upper cover plate 16. The upper cover plate 16 is arranged on the top of the first cavity 11. In another embodiment, the upper cover plate 16 is only placed on the top of the first chamber 113 without containing any connection components, thereby blocking the communication between the first chamber 113 and the outside. Also, in other embodiments, the upper cover plate 16 is connected to the first cavity 11 via a pivot member to be opened or closed by flip. In one embodiment, the waste gas inlet passage 114 is deliberately not arranged on the upper cover plate 16, but is arranged on a side wall of the first cavity 11, so as to create the effect of delayed combustion of the waste gas to achieve a sufficient reaction. In other embodiment, the waste gas inlet passage 114 is arranged on the upper cover plate 16, and through the combination of other structures, the effect of delayed combustion of the waste gas is also achieved.

Figure 4A:
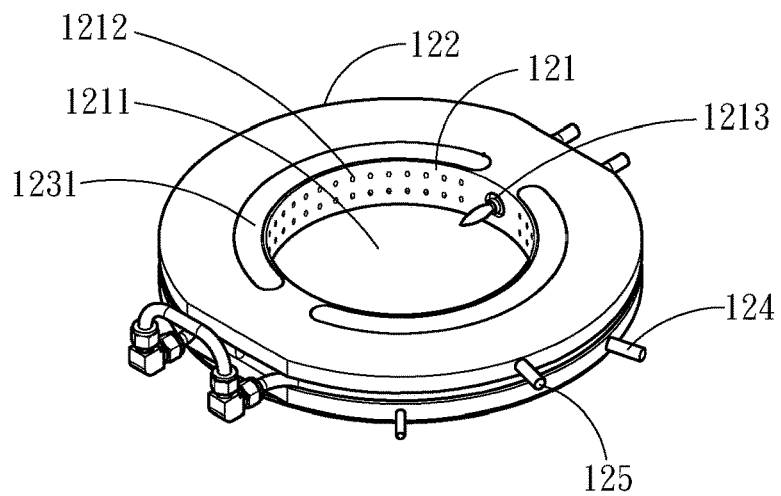
FIG. 4A is a schematic view of a first intermediate section according to an embodiment of the invention.
Figure 4B:
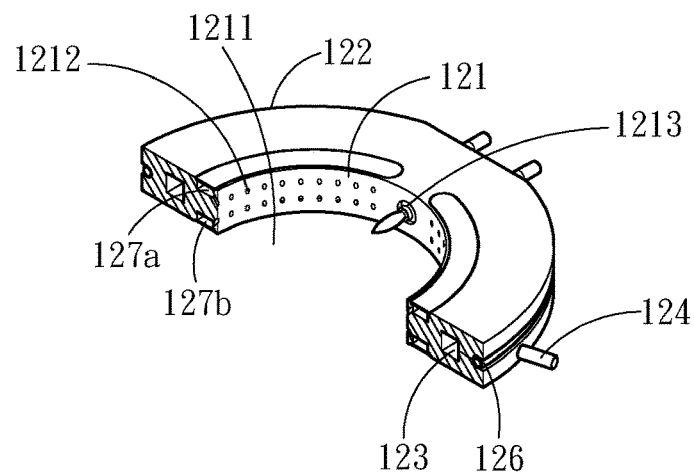
FIG. 4B is a partial cross-sectional schematic view of FIG. 4A.

Refer to FIG. 4A and FIG. 4B, the first intermediate section 12 is connected to the bottom of the first cavity 11 and is a position where the combustion starts. The first intermediate section 12 includes a first inner ring wall 121, a first outer ring wall 122 arranged concentrically with the first inner ring wall 121, a first intermediate space 123, a first gas passage 124, a second gas passage 125, and a cooling water passage 126. In other embodiment, the first intermediate section 12 further includes an upper gas passage 127a and a lower gas passage 127b, or includes an upper gas passage 127a and a lower gas passage 127b to replace the first gas passage 124 and the second gas passage 125.

The first inner ring wall 121 defines a first internal space 1211, which communicates with the first chamber 113. The first intermediate space 123 is defined between the first inner ring wall 121 and the first outer ring wall 122. The first inner ring wall 121 includes a plurality of nozzles 1212 and at least one pilot flame inlet 1213. The first gas passage 124 and the second gas passage 125 respectively pass through the first outer ring wall 122 and communicate with the first intermediate space 123. In one embodiment, the cooling water passage 126 is arranged outside of the first outer ring wall 122. Thus, the purpose of controlling the temperature of the first intermediate space 123 is achieved by flowing the cooling water through the cooling water passage 126. The upper gas passage 127a and the lower gas passage 127b are respectively arranged on an upper surface and a lower surface of the first intermediate section 12, and the upper gas passage 127a, the lower gas passage 127b and the first intermediate space 123 communicate with each other via through holes (not shown in figures), respectively.

In the first intermediate section 12, at least two kinds of gases are mixed into a fuel-rich gas, which is introduced into the first internal space 1211 to match with a pilot flame provided by the pilot flame inlet 1213 to generate combustion at a high temperature in the first internal space 1211. For example, the high temperature of the first internal space 1211 is more than 500° C., such as ranged between 500° C. and 2500° C. Regarding the gas delivery configuration of the first intermediate section 12, there are the following types:

In one embodiment, a first gas enters the first intermediate space 123 through the first gas passage 124, a second gas enters the first intermediate space 123 through the second gas passage 125. The first gas and the second gas are mixed in the first intermediate space 123 and then conveyed into the first internal space 1211 through the plurality of nozzles 1212. In another embodiment, the first gas and the second gas are first mixed outside into a premixed gas. Then, the premixed gas enters the first intermediate space 123 through the first gas passage 124 and the second gas passage 125 respectively, which are further mixed in the first intermediate space 123, and then conveyed into the first internal space 1211 through the plurality of nozzles 1212. In another embodiment, the first gas passes through the upper gas passage 127a and enters the first intermediate space 123 downwardly. The second gas passes through the lower gas passage 127b and enters the first intermediate space 123 upwardly. The first gas and the second gas are mixed in the first intermediate space 123, and then conveyed into the first internal space 1211 through the plurality of nozzles 1212. In another embodiment, the first gas and the second gas are first mixed outside into a premixed gas. Then, the premixed gas enters the first intermediate space 123 through the upper gas passage 127a and the lower gas passage 127b respectively, which are further mixed in the first intermediate space 123, and then conveyed into the first internal space 1211 through the plurality of nozzles 1212. The first gas may be a fuel, including but not limited to hydrogen, methane, natural gas, propane, liquefied petroleum gas (LPG), or a mixture of the foregoing. The second gas may be an oxidant, including but not limited to oxygen, ozone, air, compressed dry air (CDA), oxygen-rich air, or a mixture of the foregoing.

The gas pipeline configuration in the first intermediate section 12 could be adjusted as required, to introduce a combustion-assisting gas into the first intermediate space 123 in a ring shape, and then into the first internal space 1211 below the first cavity 11 to generate a high-temperature combustion environment, whereby the gas pipeline configuration is not limited to the above-mentioned configuration.

The pilot flame is formed by igniting the first intermediate section 12 or is formed in a specially designed pilot body, and then guided into the first intermediate section 12, to reduce the flameout problem in a gas inlet passage caused by gas increased suddenly (not shown in figures). The first intermediate space 123 further includes an annular passage 1231 to allow cooling water to flow through, thereby achieving the purpose of controlling the temperature of the first intermediate space 123.

Refer to FIG. 1A, FIG. 3 and FIG. 4A together, the plurality of nozzles 1212 and the pilot flame inlet 1213 are provided below the waste gas inlet passage 114 and designed to be spaced apart by a distance. In this way, after waste gas enters the first chamber 113, it will move downwardly along the vertical distance H2 to pass through a temperature gradient region, and then enter a flame environment of the first intermediate section 12. Thus, it avoids the problem of incomplete decomposition or particle deposition caused by waste gas directly entering the high-temperature flame environment too quickly.

Figure 5:
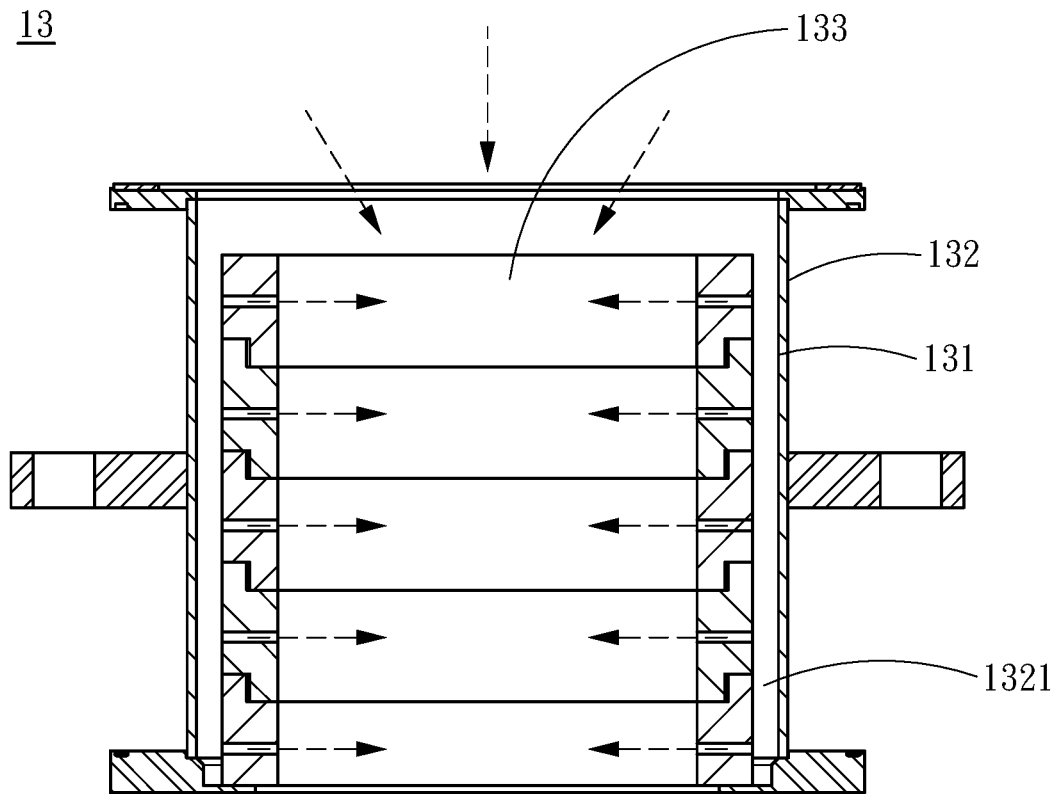
FIG. 5 is a cross-sectional schematic view of a second cavity according to an embodiment of the invention.

Refer to FIG. 1A and FIG. 5, the second cavity 13 is in an oxygen-rich reaction state to oxidize carbon monoxide to form carbon dioxide. The second cavity 13 includes a second inner wall 131 and a second outer wall 132 arranged concentrically with the second inner wall 131. The second inner wall 131 defines a second chamber 133, which is communicated with the first internal space 1211 and the first chamber 113. The second chamber 133 is a tank for gas flowing inwardly, which can avoid particle deposition and reduce the probability of particles blocking the second inner wall 131. For the purpose of continuous combustion, a gas inlet passage 1321 is arranged on the second outer wall 132, which passes through the second inner wall 131 to introduce a gas into the second chamber 133. In one embodiment, the gas is oxygen.

Figure 6:
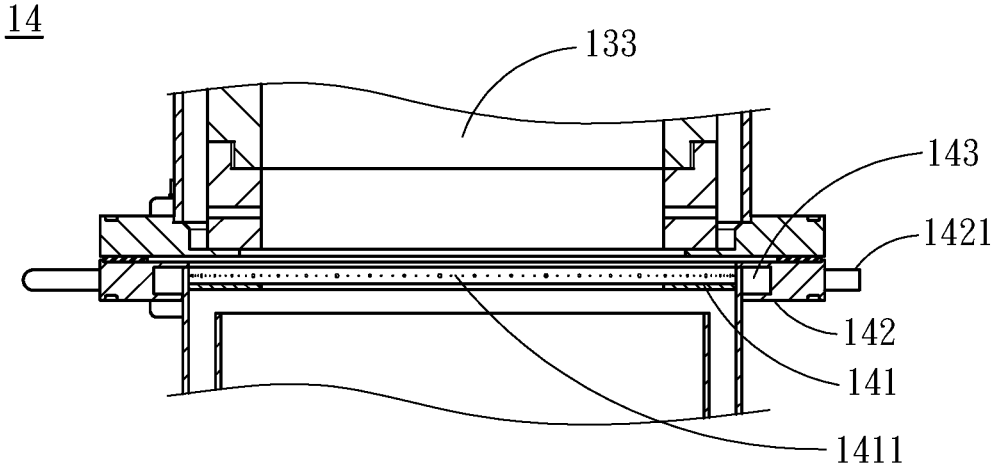
FIG. 6 is a cross-sectional schematic view of a second intermediate section according to an embodiment of the invention.

Refer to FIG. 6, the second intermediate section 14 includes a second inner ring wall 141 and a second outer ring wall 142 arranged concentrically with the second inner ring wall 141. At least one oxidant passage 1421 is arranged on the second outer ring wall 142 for introducing an oxidant. A second internal space 1411 is defined the second inner ring wall 141, and a second intermediate space 143 is defined between the second inner ring wall 141 and the second outer ring wall 142. The second internal space 1411 communicates with the second chamber 133. The oxidant passage 1421 passes through the second inner ring wall 141 to introduce the oxidant into the second internal space 1411 via the second intermediate space 143. In one preferred embodiment, the amount of introduced oxidants is sufficient to convert a fuel-rich state fluid from the second chamber 133 to a fuel-lean mixture.

Figure 7:
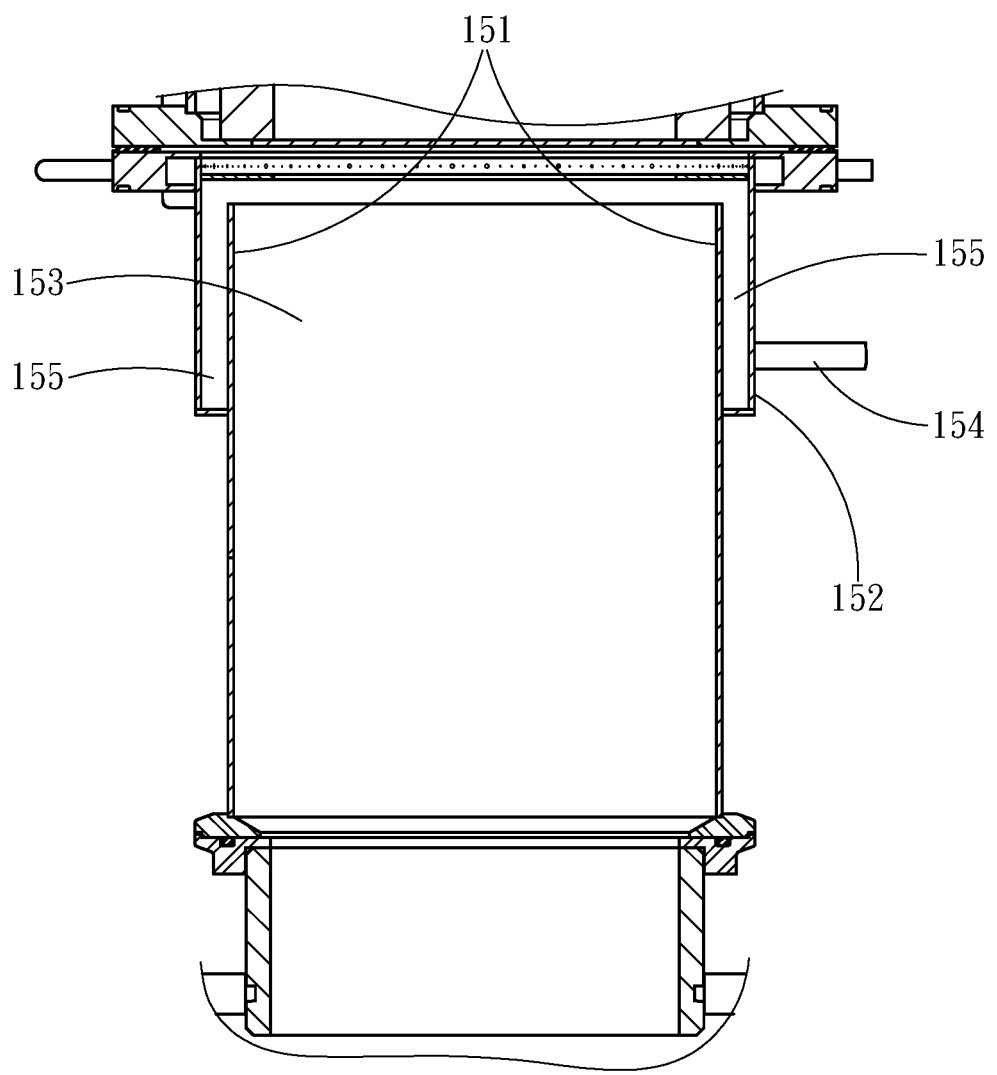
FIG. 7 is a cross-sectional schematic view of a third cavity according to an embodiment of the invention.

Refer to FIG. 6 and FIG. 7, the third cavity 15 is a cooling cavity, which is cooled by spraying a liquid to a fluid flowing therethrough. In one preferred embodiment, the liquid is a water flow. The third cavity 15 includes a third inner wall 151 and a third outer wall 152 arranged concentrically with the third inner wall 151. The third inner wall 151 defines a third chamber 153, and the third chamber 153 communicates with the second internal space 1411 and the second chamber 133. At least one liquid passage 154 is arranged on the third outer wall 152 and penetrates the third outer wall 152. A storage space 155 is provided between the third inner wall 151 and the third outer wall 152. Therefore, when the water is introduced from the liquid passage 154, the storage space 155 will be gradually filled, and finally the water overflows from the storage space 155 to form a waterfall flow, which flows down along the third inner wall 151, thereby reducing the deposition and aggregation of particles in the reaction portion 10.

The reaction portion 10 of the device 1 for decomposing and oxidizing a gaseous pollutant belongs to a two-stage combustion reaction portion. The formation of $NO_x$ and CO is minimized through the step-by-step design of the first chamber 113 and the second chamber 133. According to the experimental results, the $NO_x$ of the device 1 for decomposing and oxidizing a gaseous pollutant is below the detection limit of 15 ppm NO and 20 ppm $NO_2$.

Figure 8:
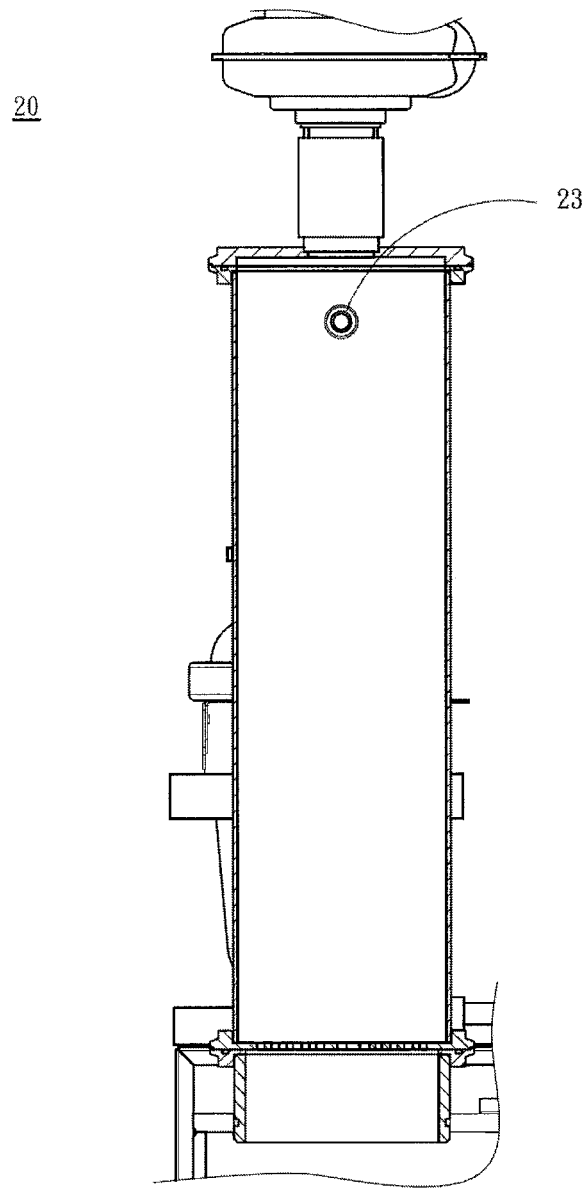
FIG. 8 is a schematic view of a washing portion according to an embodiment of the invention.

Refer to FIG. 8, the washing portion 20 is a long cylindrical shape and includes a plurality of fillers (not shown in figures) to increase a contact area between the waste gas and the fillers. In addition, an inner wall of the washing portion 20 is provided with a plurality of jets (not shown in figures), and at positions of the washing portion 20 higher than the plurality of fillers are provided with a plurality of drippers 23. For example, the plurality of fillers is made of polyvinyl chloride (PVC), but is not limited to the above materials. The plurality of jets provides an effluent treating agent between the plurality of fillers to remove residues remaining between the plurality of fillers as a fluid flowing through. As for the plurality of drippers 23, the effluent treating agent is provided in the form of large drops to wet and rinse the plurality of fillers from above. In an embodiment, the particle capture rate is increased by increasing the wet area of the washing portion 20 while reducing the flow rate of the fluid.

Figure 9:
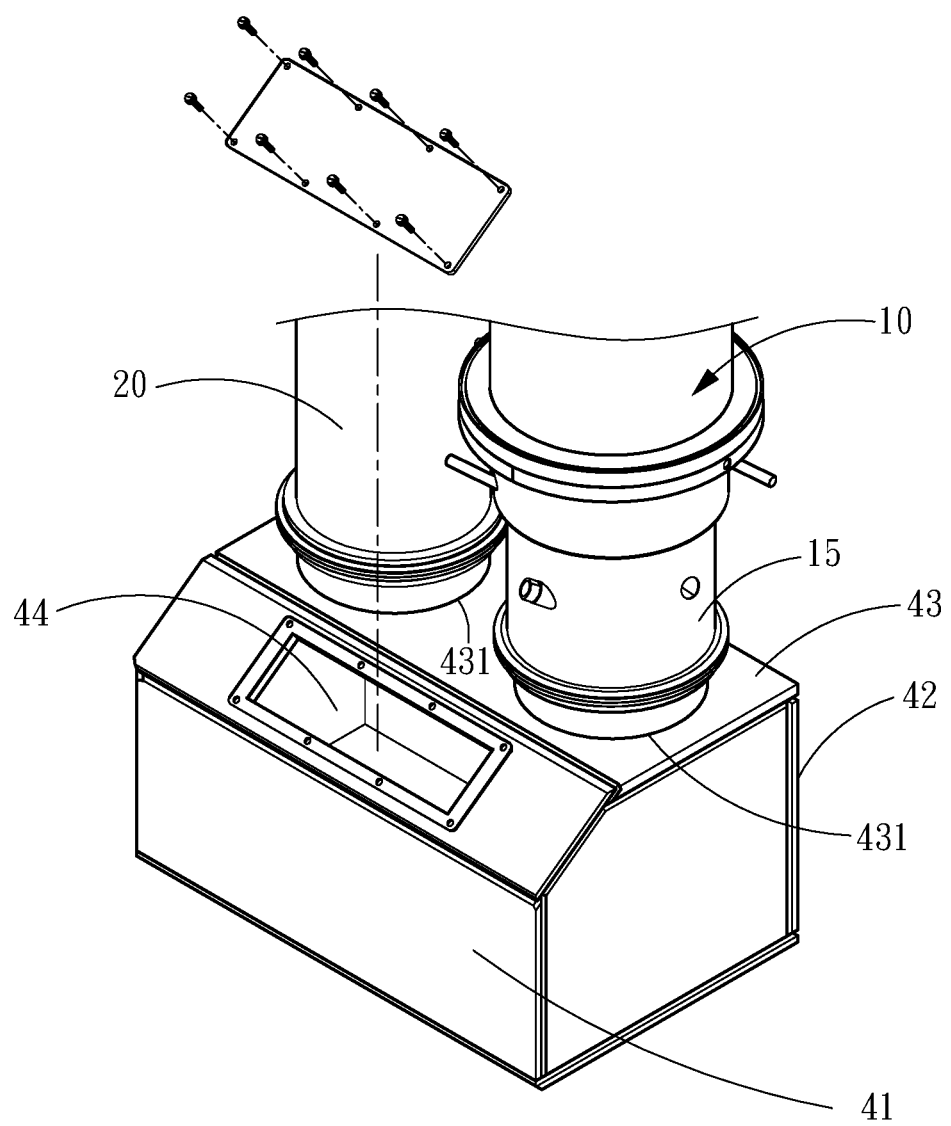
FIG. 9 is a schematic view of a water tank according to an embodiment of the invention.

FIG. 9 is a schematic view of the water tank 40 according to one embodiment thereof. The water tank 40 includes a front surface 41, a rear surface 42 opposite to the front surface 41, and a top surface 43 connecting the front surface 41 and the rear surface 42. The top surface 43 includes at least three communication ports 431, which respectively communicate with the reaction portion 10, the washing portion 20, and the hydraulic cyclone portion 30 (not shown in FIG. 9). In addition, the front surface 41 and/or the rear surface 42 are provided with at least one opening portion 44. As to the opening portion 44, the water tank 40 is easily cleaned without removing other components such as the reaction portion 10 or the washing portion 20.

Besides, in one embodiment, a water spray unit (not shown in figures) is arranged at a position where the fluid flows out of the third cavity 15 of the reaction portion 10, thereby preventing particles in the fluid from entering the washing portion 20. In another embodiment, a pH sensor (not shown in figures) is arranged on the top surface 43 of the water tank 40 to monitor the pH concentration in the water tank 40, and a real-time alarm is given when the value is abnormal. Or, in other embodiments, a water amount monitor (not shown in figures) is used to monitor the amount of water in the water tank 40 to avoid exceeding a maximum allowable range.

The hydraulic cyclone portion 30 is connected to the water tank 40 as a filter to capture the particles in the water tank 40, thereby prolonging the maintenance period of the device 1. Please refer to FIG. 1B. In the invention, a sensor 50 is further included, and the type of the sensor 50 may be selected as required. For example, respecting the reaction portion 10 is monitored through the sensor 50 to obtain a better performance of destruction and removal efficiency (DRE), a temperature sensor capable of detecting the temperature during combustion in time could be used, such as a resistance temperature detector (RTD), a thermocouple, a thermistor, an infrared sensor, a semiconductor sensor, and a thermometer, but are not limited to above. The sensor 50 penetrates into any one or more chambers in the reaction portion 10, and detects or monitors the status of waste gas reaction in real time.

In one embodiment, the sensor 50 is a charge coupled device (CCD) used to monitor the combustion temperature. The charge coupled device (CCD) is installed on the upper cover plate 16, wherein an end of the charge coupled device (CCD) passes through the upper cover plate 16 and enters the first chamber 113 (please refer to FIG. 1A, FIG. 1B and FIG. 2 together). Or, the charge coupled device (CCD) is arranged on the first outer wall 112 of the first cavity 11, wherein an end of the charge coupled device (CCD) passes through the first outer wall 112 and enters the first chamber 113 for monitoring (not shown in figures). Please refer to FIG. 10, the device 1 of the invention further includes a human-machine interface to allow a user to remotely monitor and remotely control the device 1 via an appropriate wired or wireless device 80 (such as a smart phone). The connection between the charge coupled device (CCD) and the human-machine interface may be wired or wireless, and is not limited thereto.

The invention further integrates the above-mentioned device 1 with a control portion 70 into a system for controlling the decomposing and oxidizing a gaseous pollutant.

Figure 10:
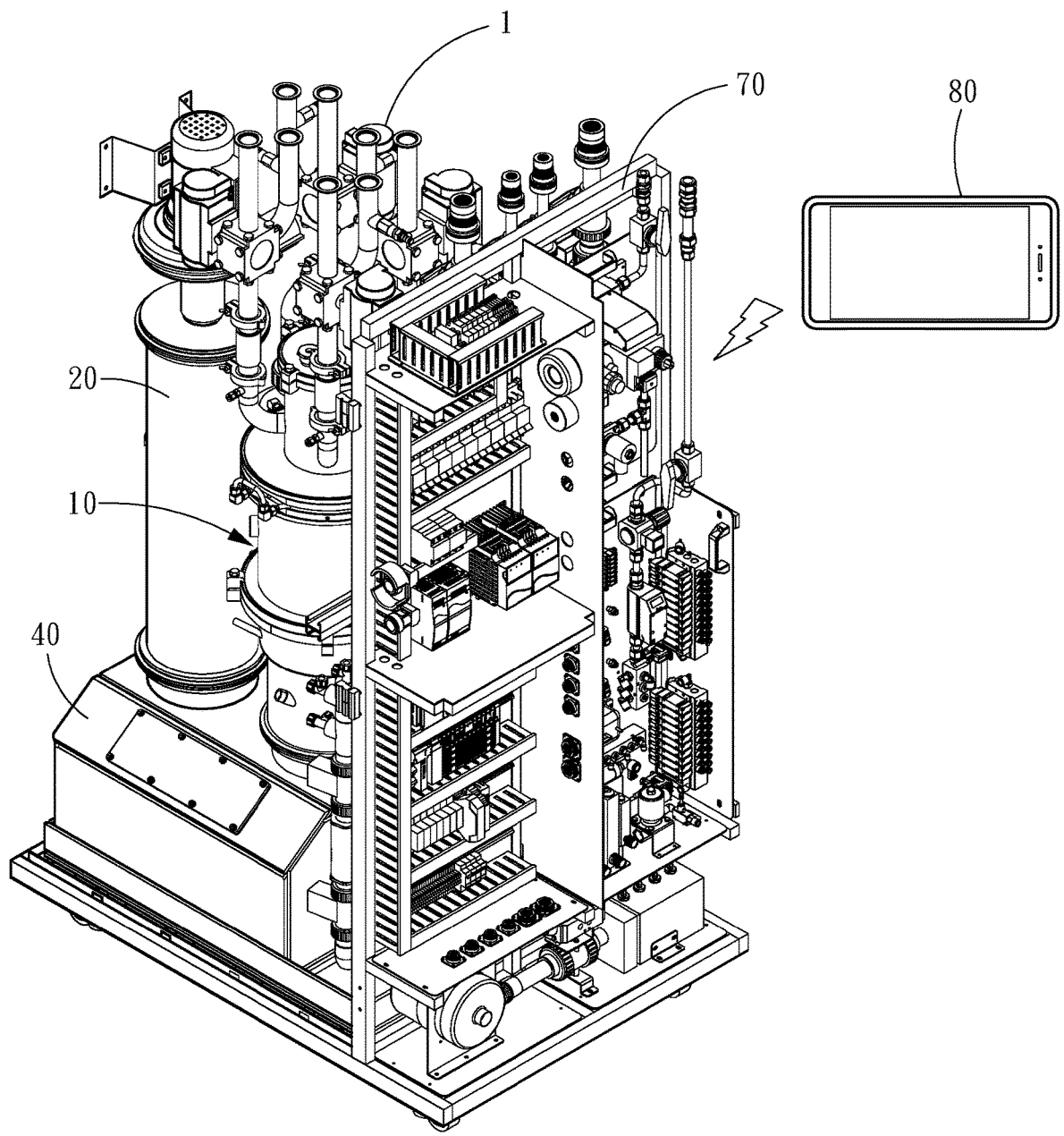
FIG. 10 is a schematic view of a system for decomposing and oxidizing of a gaseous pollutant according to an embodiment of the invention.

Please refer to FIG. 10. The system includes an equipment portion (i.e., the device 1) and the control portion 70. The components of the equipment portion are as described above, and will not be described here. The control portion 70 extends vertically upward and is arranged adjacent to one side of the device 1 in parallel. The control portion 70 includes a plurality of control switches that are electrically and respectively connected to the reaction portion 10, the washing portion 20, the hydraulic cyclone portion 30 (not shown in FIG. 10), and the water tank 40 of the device 1 in order to control the device 1.

The invention may further utilize the aforementioned wired or wireless device 80 to remotely control the control portion 70, as shown in FIG. 10.

Figure 11:
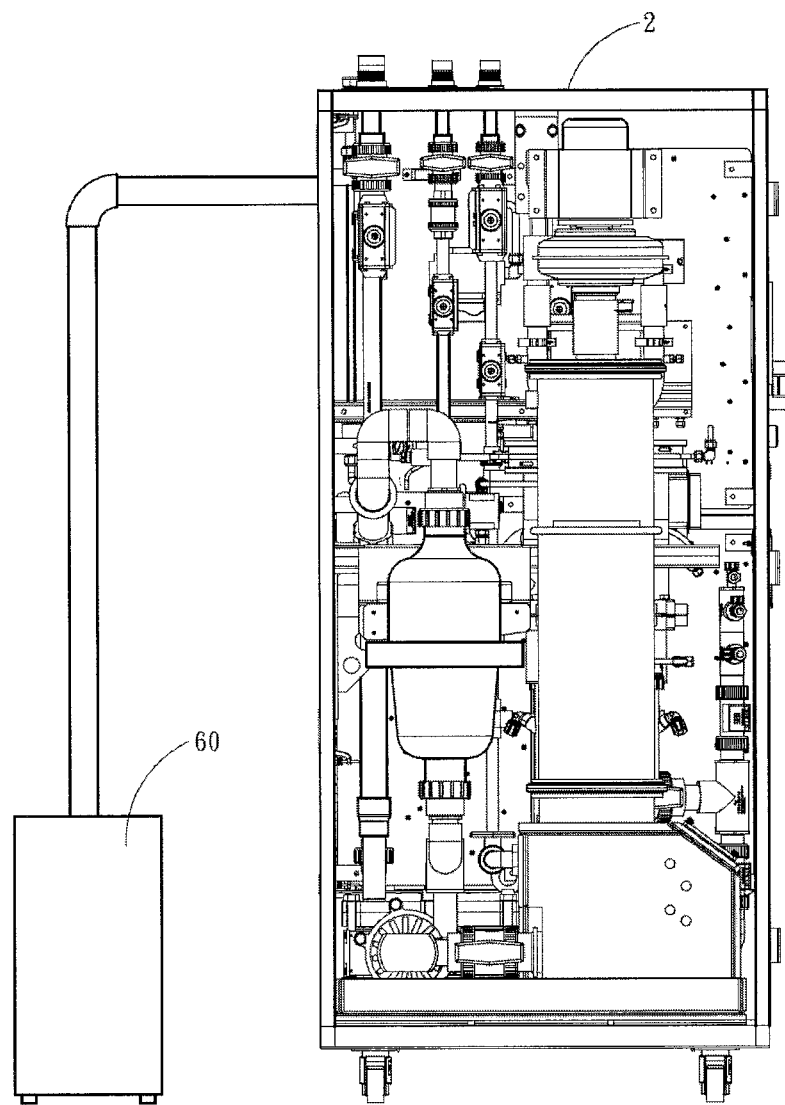
FIG. 11 is a schematic view of a system for decomposing and oxidizing of a gaseous pollutant according to another embodiment of the invention.

In one embodiment, the device 1 is installed in a housing 2 as shown in FIG. 11, and further includes a pump 60.

In one embodiment, an opening on the back side of a housing of the device 1 is removed, and then another casing that accommodates the pump 60 is combined with the device 1. Accordingly, the regions of other manufacturing devices (such as the pump 60) are reduced, so that more tools are allowed to be installed in a limited space, and the interconnection wiring of the pump 60 is reduced, thereby achieving the purpose of reducing installation costs and saving time.

Figure 12:
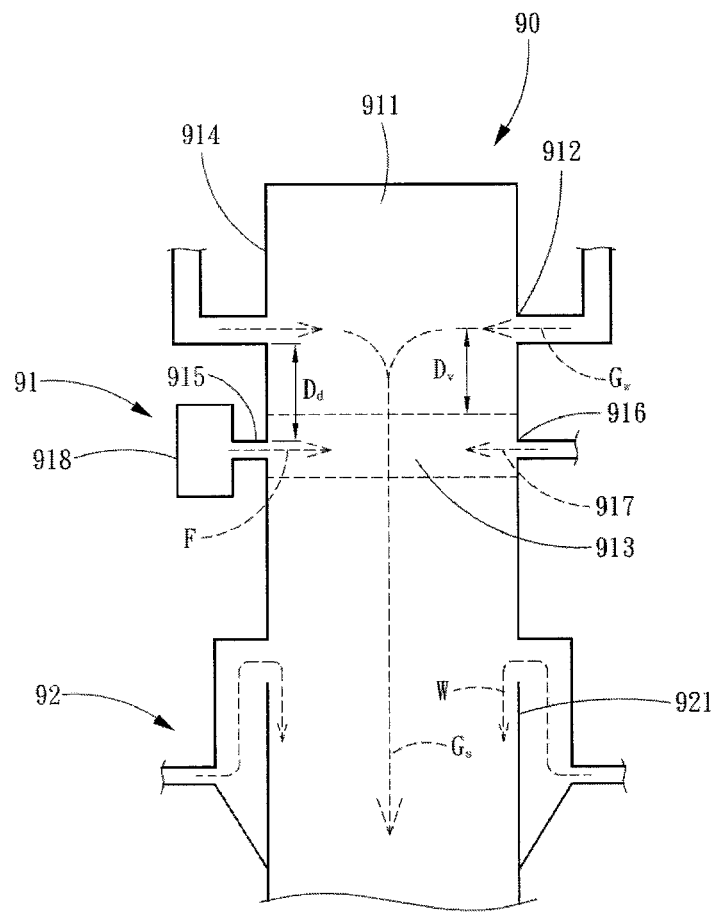
FIG. 12 is a schematic view of a thermal reactor for removing a pollutant from waste gas according to an embodiment of the invention.
Figure 13:
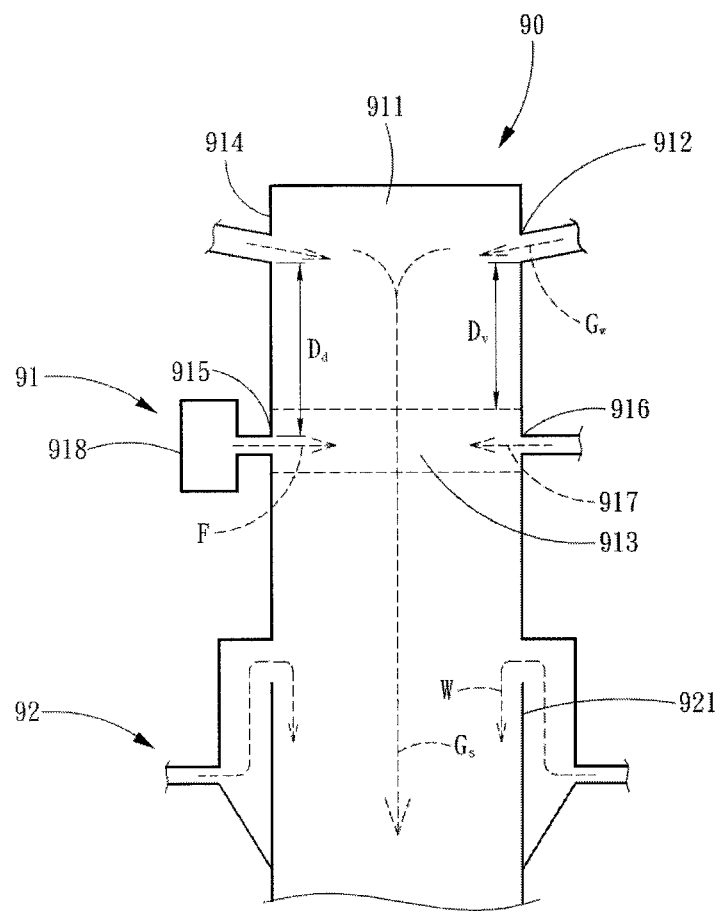
FIG. 13 is a schematic view of another embodiment of a waste gas inlet in FIG. 12.

The invention also provides a thermal reactor 90 for removing a pollutant from a waste gas. Please refer to FIG. 12. In one embodiment, the thermal reactor 90 includes a thermal reaction unit 91 and a chilling unit 92. The thermal reaction unit 91 includes a chamber 911, at least one waste gas inlet 912 and a flame region 913. The chamber 911 comprises a side wall 914, and the waste gas inlet 912 penetrates the side wall 914 and communicates with the chamber 911 to introduce a waste gas $G_w$ into the chamber 911 in a non-longitudinal direction. The flame region 913 is formed in the chamber 911 and is located below the waste gas inlet 912, so that after the waste gas $G_w$ is introduced into the chamber 911, it moves downwardly along a vertical distance $D_v$ to enters the flame region 913. In the embodiment, the non-longitudinal direction is a horizontal direction. In other embodiments, the non-longitudinal direction may be other non-vertical and oblique direction that comprises an angle less than 90 degrees with a horizontal plane, as shown in FIG. 13. In this way, when the waste gas $G_w$ is introduced into the chamber 911, it will not immediately contact the flame region 913. Therefore, the thermal reactor 90 has an effect of preventing the waste gas $G_w$ from being deposited on an inner wall of the chamber 911 due to incomplete decomposition. The chilling unit 92 is arranged below and connected to the thermal reaction unit 91, and the chilling unit 92 is configured to receive a gas stream Gs from the thermal reaction unit 91. The chilling unit 92 includes a water curtain W flowing through an inner wall 921 of the chilling unit 92.

In the embodiment, the thermal reaction unit 91 further includes at least one fuel inlet 915 and a pilot flame inlet 916. The fuel inlet 915 introduces a fuel F into the chamber 911. The pilot flame inlet 916 provides a pilot flame 917 for igniting the fuel F. In FIG. 12 and FIG. 13, the fuel inlet 915 and the pilot flame inlet 916 are provided below the waste gas inlet 912, but are not limited to. In other examples, the fuel inlet 915 and the pilot flame inlet 916 may be optionally provided at other positions, as long as the flame region 913 is formed in the chamber 911 and is located below the waste gas inlet 912. In addition, in an embodiment, the fuel F may be mixed with an air or another gas in a premixing chamber 918 and then conveyed to the chamber 911.

In another embodiment, please also refer to FIG. 12 and FIG. 13. The thermal reactor 90 includes a thermal reaction unit 91 and a chilling unit 92. The thermal reaction unit 91 includes a chamber 911, at least one waste gas inlet 912, at least one fuel inlet 915, and a pilot flame inlet 916. The waste gas inlet 912 communicates with the chamber 911 to introduce a waste gas $G_w$ into the chamber 911. The fuel inlet 915 communicates with the chamber 911 to introduce a fuel F. The fuel F is used in a decomposition process of the waste gas $G_w$ in the chamber 911. The pilot flame inlet 916 communicates with the chamber 911 to provide a pilot flame 917 for igniting the fuel F. In the embodiment, the fuel inlet 915 and the pilot flame inlet 916 are provided below the waste gas inlet 912, and are separated apart from the waste gas inlet 912 by a delayed combustion distance $D_d$. The chilling unit 92 is arranged below and connected to the thermal reaction unit 91, and the chilling unit 92 is configured to receive a gas stream $G_s$ from the thermal reaction unit 91. The chilling unit 92 includes a water curtain W flowing through an inner wall 921 of the chilling unit 92. In FIG. 12 and FIG. 13, the waste gas inlet 912 penetrates the side wall 914 and communicates with the chamber 911 to introduce a waste gas $G_w$ into the chamber 911 in a non-longitudinal direction. However, in other embodiments, the waste gas inlet 912 may introduce the waste gas $G_w$ into the chamber 911 in other directions, as long as the fuel inlet 915 and the pilot flame inlet 916 are provided below the waste gas inlet 912 and spaced apart by the delayed combustion distance $D_d$, for the purpose of delayed ignition.

Figure 14:
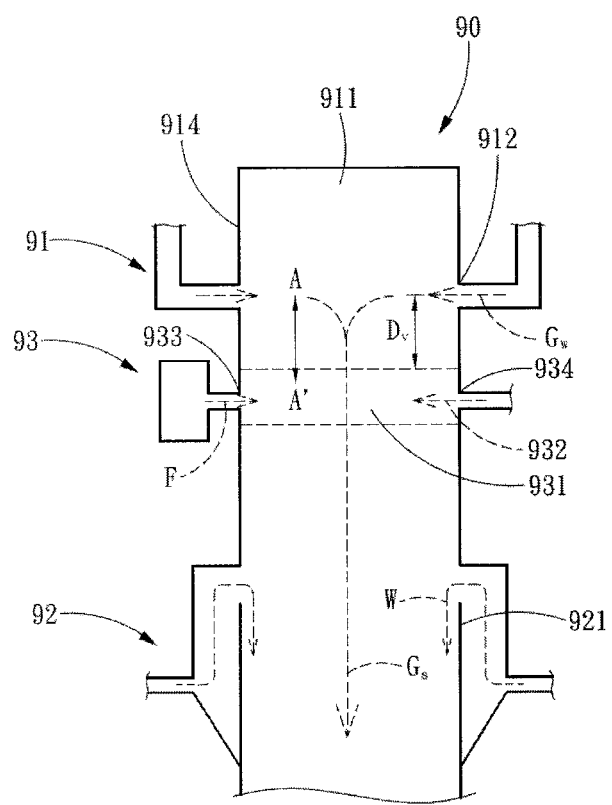
FIG. 14 is a schematic view of a thermal reactor for removing a pollutant from waste gas according to another embodiment of the invention.

In another embodiment, please refer to FIG. 14. The thermal reactor 90 includes a thermal reaction unit 91, a chilling unit 92 and an ignition unit 93. The thermal reaction unit 91 includes a chamber 911 and at least one waste gas inlet 912. The waste gas inlet 912 communicates with the chamber 911 to introduce a waste gas $G_w$ into the chamber 911. The ignition unit 93 is connected to the thermal reaction unit 91. The ignition unit 93 includes a flame chamber 931. The flame chamber 931 communicates with the chamber 911. The flame chamber 931 includes a fuel F, a pilot flame 932 for igniting the fuel F, at least one fuel inlet 933, and a pilot flame inlet 934. The fuel inlet 933 introduces the fuel F into the chamber 911, and the pilot flame inlet 934 provides the pilot flame 932. The chilling unit 92 is arranged below and connected to the thermal reaction unit 91, and the chilling unit 92 is configured to receive a gas stream $G_s$ from the thermal reaction unit 91. The chilling unit 92 includes a water curtain W flowing through an inner wall 921 of the chilling unit 92. In the embodiment, the waste gas $G_w$ enters the flame chamber 931 after entering the chamber 911 downward for a vertical distance $D_v$.

Figure 15:
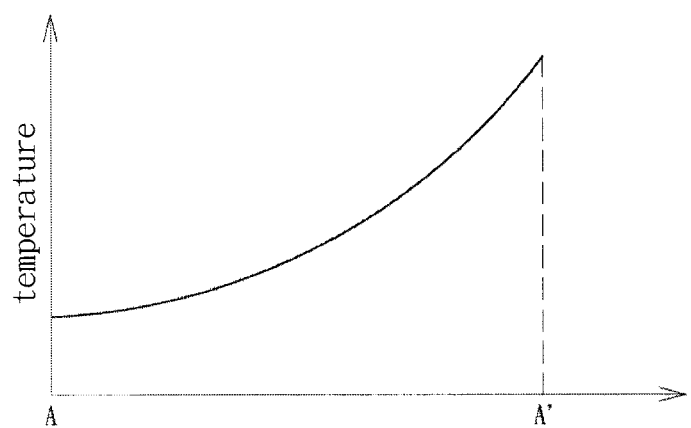
FIG. 15 is a schematic view of a temperature gradient of A-A' in FIG. 14.

In another embodiment, a temperature gradient which gradually increases temperature downward is formed between the waste gas inlet 912 and the pilot flame 932 along a vertical axis. That is, from a part A adjacent to the waste gas inlet 912 to a part A' of the flame chamber 931, the temperature gradient gradually increases, as shown in FIG. 15. In the embodiment, the angle of the waste gas inlet 912, the arrangement positions of the fuel inlet 915 and the pilot flame inlet 916, or the arrangement position of the flame region 913 may refer to the above-mentioned FIG. 12, FIG. 13, and FIG. 14. Or, other designs may also be adopted, as long as the temperature gradient is formed between the waste gas inlet 912 and the pilot flame 932.

In other embodiments, please refer to FIG. 12 or FIG. 13. The thermal reactor 90 includes a thermal reaction unit 91 and a chilling unit 92. The thermal reaction unit 91 includes a chamber 911 and at least one waste gas inlet 912. The waste gas inlet 912 communicates with the chamber 911 to introduce a waste gas $G_w$ into the chamber 911. The chilling unit 92 is arranged below and connected to the thermal reaction unit 91, and the chilling unit 92 is configured to receive a gas stream $G_s$ from the thermal reaction unit 91. The chilling unit 92 includes a water curtain W flowing through an inner wall 921 of the chilling unit 92.

In another embodiment, please refer to FIG. 14. The thermal reactor 90 includes a thermal reaction unit 91, a chilling unit 92 and an ignition unit 93. The thermal reaction unit 91 includes a chamber 911 and at least one waste gas inlet 912. The waste gas inlet 912 communicates with the chamber 911 to introduce a waste gas $G_w$ into the chamber 911. The ignition unit 93 is arranged below the thermal reaction unit 91 and connected to the thermal reaction unit 91. The ignition unit 93 includes an outer wall, an inner wall, a premixing chamber defined between the outer wall and the inner wall, and a flame chamber 931 defined by the inner wall. FIG. 4A and FIG. 4B show the structure of the ignition unit 93. The chilling unit 92 is arranged below and connected to the ignition unit 93, and the chilling unit 92 is configured to receive a gas stream $G_s$ from the thermal reaction unit 91. The chilling unit 92 includes a water curtain W flowing through an inner wall 921 of the chilling unit 92.

Figure 16:
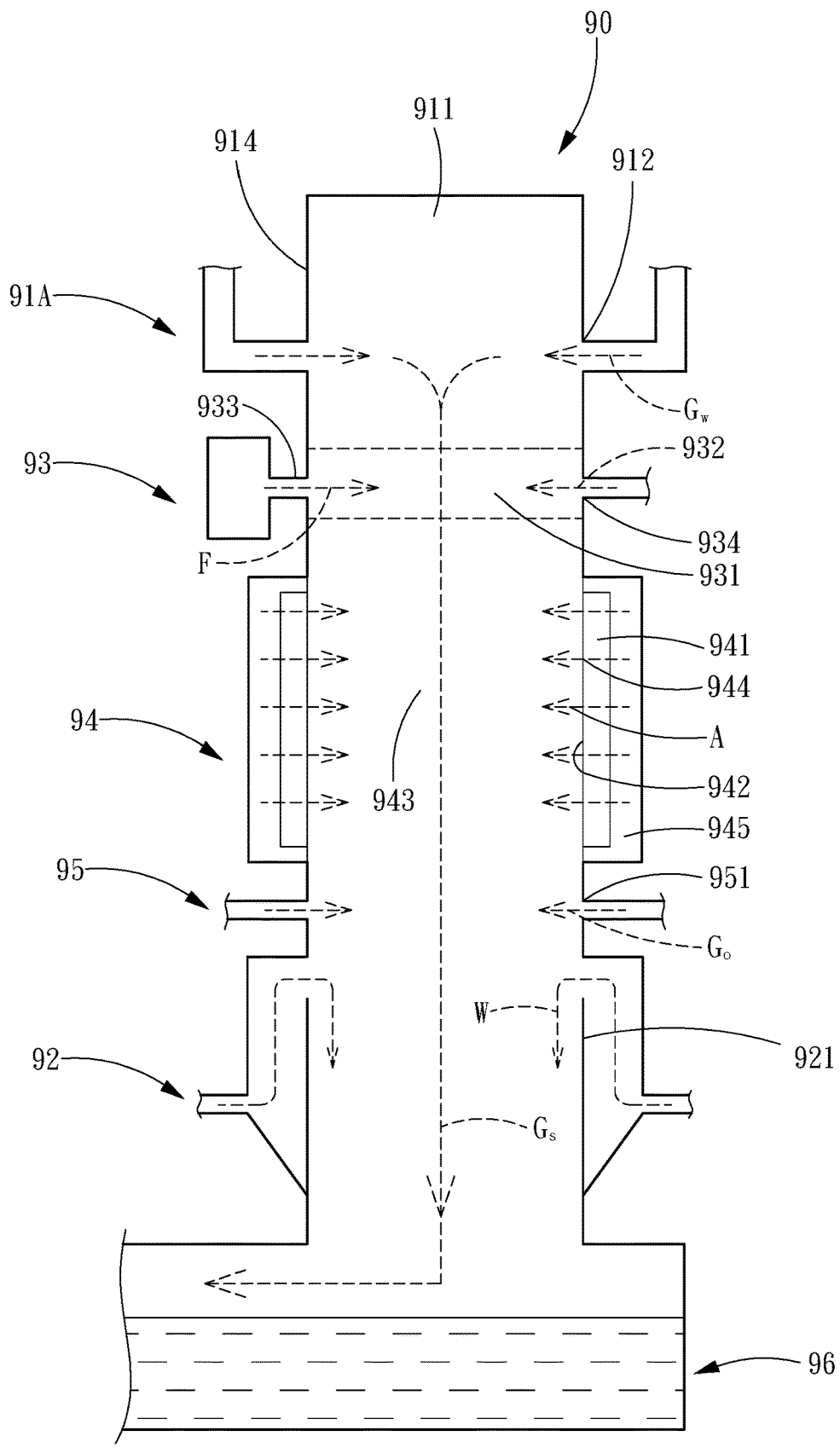
FIG. 16 is a schematic view of a thermal reactor for removing a pollutant from waste gas according to another embodiment of the invention.

In another embodiment, please refer to FIG. 16. The thermal reactor 90 includes a first thermal reaction unit 91A, a chilling unit 92, an ignition unit 93, a second thermal reaction unit 94, and an oxygen-rich gas supply unit 95. The first thermal reaction unit 91A includes a chamber 911 and at least one waste gas inlet 912. The waste gas inlet 912 communicates with the chamber 911 to introduce a waste gas $G_w$ into the chamber 911. The ignition unit 93 includes a flame chamber 931. The flame chamber 931 communicates with the chamber 911. The flame chamber 931 includes a fuel F and a pilot flame 932 for igniting the fuel F. The second thermal reaction unit 94 is arranged below the ignition unit 93. The second thermal reaction unit 94 includes a ceramic portion 941, an inner wall 942, a chamber 943 defined by the inner wall 942, at least one gas inlet hole 944 that penetrates the inner wall 942 and provides a gas flow A, and a gas flow passage 945 that supplies the gas flow A. In the embodiment, the gas flow A is a room-temperature air. The oxygen-rich gas supply unit 95 is arranged below the second thermal reaction unit 94 and includes at least one gas inlet hole 951. The oxygen-rich gas supply unit 95 conveys an oxygen-rich gas $G_o$ from the gas inlet hole 951 to the chamber 911 of the thermal reactor 90. The chilling unit 92 is arranged below the first thermal reaction unit 91A and communicates with the chamber 911 to receive a gas stream Gs from the first thermal reaction unit 91A. The chilling unit 92 includes a water curtain W flowing through an inner wall 921 of the chilling unit 92.

Figure 17:
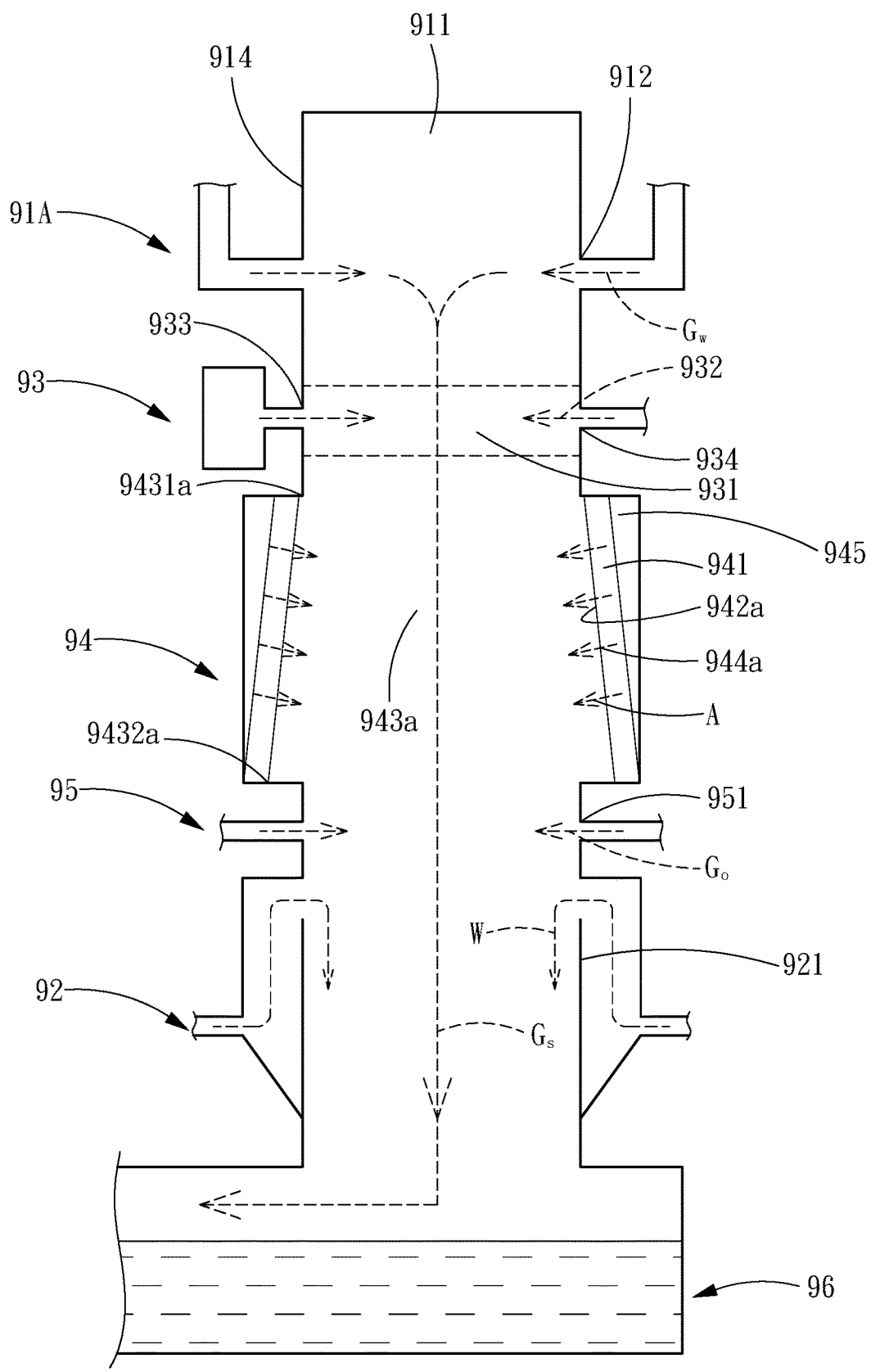
FIG. 17 is a schematic view of a thermal reactor for removing a pollutant from waste gas according to other embodiments of the invention.

Please refer to FIG. 17. In other embodiments, the second thermal reaction unit 94 includes an inclined inner wall 942a, a conical chamber 943a defined by the inclined inner wall 942a, and at least one inclined gas inlet hole 944a that penetrates the inclined inner wall 942a and provides a gas flow A. The conical chamber 943a comprises a top opening 9431a communicating with the flame chamber 931 and a bottom opening 9432a having a larger diameter than the top opening 9431a. The gas flow A is sprayed obliquely downward into the conical chamber 943a. By the design of the inclined inner wall 942a, particles of the waste gas $G_w$ is slowed down and deposited on the inclined inner wall 942a.

The components in the embodiments of FIG. 12, FIG. 13, FIG. 14, FIG. 15, FIG. 16, and FIG. 17 can be cross-referenced, and can also be cross-referenced to the components in the embodiments of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, and FIG. 16.

What is claimed is:

1. A thermal reactor for removing a pollutant from waste gas, comprising:
   a thermal reaction unit, comprising a chamber and at least one waste gas inlet, the waste gas inlet communicating with the chamber to introduce a waste gas into the chamber;
   an ignition unit, arranged below the thermal reaction unit and connected to the thermal reaction unit, the ignition unit comprising an outer wall, an inner wall, a premixing chamber defined between the outer wall and the inner wall, and a flame chamber defined by the inner wall; and
   a chilling unit, arranged below the ignition unit, connected to the ignition unit and configured to receive a gas stream from the thermal reaction unit, wherein the chilling unit comprises a water curtain flowing through an inner wall of the chilling unit;
   wherein the premixing chamber contains a fuel and a gas mixed with the fuel, the flame chamber communicating with the premixing chamber through at least one through hole in the inner wall, and the fuel enters the flame chamber via the through hole and is ignited by a pilot flame after being mixed with the gas in the premixing chamber.

2. The thermal reactor of claim 1, wherein the ignition unit further comprises a pilot flame inlet provided on the inlet wall, the pilot flame inlet communicating with the flame chamber to ignite the fuel.

* * * * *